US012677268B2

(12) United States Patent
Li et al.

(10) Patent No.: US 12,677,268 B2
(45) Date of Patent: Jul. 7, 2026

(54) METHODS FOR INSERTING AND EXTRACTING OPERATIONS, ADMINISTRATION, AND MAINTENANCE OF TRANSMITTING END, DEVICE, AND MEDIUM

(71) Applicants: China Mobile Communication Co., Ltd Research Institute, Beijing (CN); China Mobile Communications Group Co., Ltd., Beijing (CN)

(72) Inventors: Han Li, Beijing (CN); Weiqiang Cheng, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 503 days.

(21) Appl. No.: 18/043,406

(22) PCT Filed: Aug. 26, 2021

(86) PCT No.: PCT/CN2021/114763
§ 371 (c)(1),
(2) Date: Feb. 28, 2023

(87) PCT Pub. No.: WO2022/042647
PCT Pub. Date: Mar. 3, 2022

(65) Prior Publication Data
US 2023/0337212 A1 Oct. 19, 2023

(30) Foreign Application Priority Data
Aug. 28, 2020 (CN) .......................... 202010883893.4

(51) Int. Cl.
*H04W 72/12* (2023.01)

(52) U.S. Cl.
CPC .................................. *H04W 72/12* (2013.01)

(58) Field of Classification Search
None
See application file for complete search history.

(56) References Cited

U.S. PATENT DOCUMENTS 10,097,480 B2 * 10/2018 Gareau ................... H04J 3/065
2019/0280913 A1 9/2019 Huang et al.
(Continued)

FOREIGN PATENT DOCUMENTS

CN 108123813 A 6/2018
CN 109347648 A 2/2019
(Continued)

OTHER PUBLICATIONS

China Mobile et al., "Option 2b MTN Path Overhead—Proposed version for comparison", CD11-05, Study Group 15, International Telecommunication Union, Mar. 31, 2020 (Mar. 31, 2020), pp. 1-21, vol. 11/15, Geneva, CH.
(Continued)

*Primary Examiner* — Kodzovi Acolatse
(74) *Attorney, Agent, or Firm* — Price Heneveld LLP

(57) ABSTRACT

Operations, Administration and Maintenance insertion method and device and Operations, Administration and Maintenance extraction method and device, and medium are provided. The method includes: MTN path-layer OAM is carried by code blocks; one or more path-layer OAM code blocks are inserted into a code block sequence with a nominal period of N. The one or more path-layer OAM code blocks are extracted from the code block sequence with the nominal period of N.

16 Claims, 2 Drawing Sheets

Adopting code blocks to carry MTN path-layer OAM ⟩ 101

Inserting path-layer OAM code blocks into a code block sequence with a nominal period of N ⟩ 102

(56)             References Cited

U.S. PATENT DOCUMENTS

| | | | |
|---|---|---|---|
| 2020/0220650 A1* | 7/2020 | Cheng | H04L 41/34 |
| 2020/0328767 A1 | 10/2020 | Zhong et al. | |
| 2020/0412471 A1* | 12/2020 | Gareau | H04J 3/0697 |
| 2023/0119339 A1* | 4/2023 | Li | H04L 1/0061 |
| | | | 714/726 |
| 2023/0164624 A1* | 5/2023 | Chen | H04L 69/08 |
| | | | 370/230 |

FOREIGN PATENT DOCUMENTS

| | | | | |
|---|---|---|---|---|
| CN | 109995455 A | 7/2019 | | |
| WO | WO-2019056899 A1 * | 3/2019 | | H04L 41/34 |
| WO | 2020247003 A1 | 12/2020 | | |

OTHER PUBLICATIONS

Tom Huber et al., "Draft new Recommendation G.mtn", ITU-T Draft; Study Period 2017-2020; Study Group 15; Series CD11-58R1, International Telecommunication Union, Jul. 24, 2020 (Jul. 24, 2020), pp. 1-21, vol. 11/15, Geneva, CH.

China Information Communication Technologies Group (CICT) et al., "Consideration of G.MTN POH receiving mechanisms", G.MTN POH receiving mechanism; C1996, ITU-T Draft; Study Period 2017-2020; Study Group 15; Series C1996, International Telecommunication Union, pp. 1-3, vol. 11/15, eMeeting Sep. 7-18, 2020, Geneva, CH.

Suzuki Suzuki (Fujitsu), "OTN WDM Delivery Latest Trends", MPLS Japan 2019, Oct. 15, 2019.

\* cited by examiner

METHODS FOR INSERTING AND EXTRACTING OPERATIONS, ADMINISTRATION, AND MAINTENANCE OF TRANSMITTING END, DEVICE, AND MEDIUM

CROSS-REFERENCE TO RELATED APPLICATION

This application is a U.S. national phase application of a PCT Application No. PCT/CN2021/114763 filed on Aug. 26, 2021, which claims a priority to Chinese Patent Application No. 202010883893.4 filed on Aug. 28, 2020, the disclosures of which are incorporated in their entirety by reference herein.

TECHNICAL FIELD

The present disclosure relates to the field of radio communications technology, in particular, relates to methods and devices of inserting and extracting operations, administration, and maintenance at a sending end, and a medium.

BACKGROUND

Slicing Packet Network (SPN) is a transport network technology mechanism mainly oriented to carrying integrated services in a metropolitan area, implements carrying of integrated services with high quality requirements such as a front haul/a middle haul/a back haul, a dedicated line/a dedicate network of an enterprise, a home broadband uplink connection, and has service carrying capabilities of providing resource slice isolation on a physical network and providing differentiated services of multiple traffic (such as a bandwidth, a delay, a jitter, etc.).

The SPN network mainly has the following basic technical characteristics:

end-to-end cross-connections based on Metro Transport Network (MTN) paths: providing hard slicing of a packet network, a low forwarding latency, and a bandwidth guarantee through cross-connections based on sequences of 66B code block, and providing an operator-level operation and maintenance capability of hard slices through end-to-end OAM (Operations, Administration and Maintenance) and protection of a MTN path layer;

operator-level fault detection and performance management: which has network-level layered OAM fault detection and performance management capabilities, supports monitoring and management of attributes such as connectivity, a packet loss rate, a latency and a jitter to various logical levels, various network connections and various services through the OAM mechanism.

The SPN adopts MTN Path and MTN Section (MTN slice) technologies based on Time Division Multiplexing (TDM) slots to provide L1-based low-latency, hard-isolated slice channels for multi-service carrying, following technologies are included:

MTN Channel (MTN tunnel): channels of cross-connections (S-XC) of Ethernet 66B code block sequences for 50GE and above interfaces, which realizes L1-layer networking of end-to-end slice channels;

S-XC: L1 channel crossover technology based on Ethernet 66B code block sequences;

MTN Path layer and its OAM overhead: extension of the Ethernet 66B code block for 50GE and above interfaces, and IDLE (idle) code blocks are replaced with one or more OAM code blocks to realize an OAM function of the MTN Path layer;

MTN Section layer frame structure and its OAM overhead: reusing MTN section layer network interface and its alarm and performance management overhead functions of OIF FlexE (OIF (Optical Internet Forum) FlexE) frame structure, sub-rate, binding and other functional logic.

The deficiency of the related art lies in how to insert the OAM code block.

SUMMARY

The present disclosure provides an OAM insertion method and device at a sending end, an OAM extraction method and device at a sending end, and a storage medium, to solve a problem of how to insert an OAM code block.

The present disclosure provides the following technical solutions.

An Operations, Administration and Maintenance (OAM) insertion method at a sending end includes: adopting code blocks carrying Metro Transport Network (MTN) path-layer OAM; inserting one or more path-layer OAM code blocks into a code block sequence with a nominal period of N.

During implementation, the code blocks are 64B/66B code blocks.

During implementation, positions where the one or more OAM code blocks are inserted are located in one or more InterPacket Gaps (IPG).

During implementation, $N=n \times 16$ k, n is a quantity of calendar slots occupied by a path.

During implementation, one of the calendar slots is 5 Gbps.

During implementation, the method further includes: deleting, by the MTN path layer, Idle Blocks from the code block sequence as required, to compensate for insertion of the one or more OAM code blocks.

During implementation, the one or more OAM code blocks are Ordered Set blocks having Type=0x4B, O code=0xC.

During implementation, insertion opportunities when performing insertion include one or a combination of following types: a first type of insertion opportunities, the first type of opportunities being opportunities to insert path status and error monitoring information; a second type of insertion opportunities, the second type of opportunities being opportunities to insert Automatic Protection Switch (APS) information; a third type of insertion opportunities, the third type of insertion opportunities being opportunities to insert blocks in low priority messages.

During implementation, the method further includes: not using insertion opportunities for unavailable APS or low priority messages.

During implementation, a regular pattern of the third type of insertion opportunities is 64 insertion opportunities of the third type.

During implementation, in the regular pattern of the third type of insertion opportunities, messages are sent in one or a combination of following ways: sending Connectivity Verification (CV) messages in first to seventeenth allocated opportunities of the 64 opportunities; sending a Client Signal (CS) message at an eighteenth opportunity of the 64 opportunities; sending a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

During implementation, the 1DM message and the 2DMM message are sent when a system request exists.

During implementation, the 2DMR message is sent in response to a received 2DMM message.

During implementation, no message is sent in the reserved opportunities.

During implementation, the method further includes: determining whether the one or more OAM code blocks are locked or unlocked in following manners: for the first type of insertion opportunities, if i consecutive messages of the first type of insertion opportunities are found in expected positions, then entering a frame lock state; if messages of the first type of insertion opportunities are not found in j consecutive expected positions, then entering a frame unlock state; for the third type of insertion opportunities, if correct code blocks are received at expected positions of first code blocks of consecutive k CV messages, then entering the frame lock state; if a correct code block is not received at an expected position of a first code block of consecutive 1 CV message, then entering the frame unlock state; wherein, i, j, k are preset values.

An Operations, Administration and Maintenance (OAM) extraction method at a sending end includes: adopting code blocks carrying Metro Transport Network (MTN) path-layer OAM; extracting one or more path-layer OAM code blocks from a code block sequence with a nominal period of N.

During implementation, the code blocks are 64B/66B code blocks.

During implementation, positions where the one or more OAM code blocks are extracted are located in one or more InterPacket Gaps (IPG).

During implementation, $N=n\times16$ k, n is a quantity of calendar slots occupied by a path.

During implementation, one of the calendar slots is 5 Gbps.

During implementation, the method further includes: inserting, by the MTN path layer, Idle Blocks into the code block sequence as required, to compensate for extraction of the one or more OAM code blocks.

During implementation, the one or more OAM code blocks are Ordered Set blocks having Type=0x4B, O code=0xC.

During implementation, extraction opportunities when performing extraction include one or a combination of following types: a first type of extraction opportunities, the first type of opportunities being opportunities to extract path status and error monitoring information; a second type of extraction opportunities, the second type of opportunities being opportunities to extract Automatic Protection Switch (APS) information; a third type of extraction opportunities, the third type of extraction opportunities being opportunities to extract blocks from low priority messages.

During implementation, the method further includes: not performing extraction from unavailable APS or low priority messages.

During implementation, a regular pattern of the third type of extraction opportunities is 64 extraction opportunities of the third type.

During implementation, in the regular pattern of the third type of extraction opportunities, messages are received in one or a combination of following ways: receiving Connectivity Verification (CV) messages in first to seventeenth allocated opportunities of the 64 opportunities; receiving a Client Signal (CS) message at an eighteenth opportunity of the 64 opportunities; receiving a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

During implementation, the 1DM message and the 2DMM message are received when a system request exists.

During implementation, the 2DMR message is received in response to a sent 2DMM message.

During implementation, no message is received in the reserved opportunities.

During implementation, the method further includes: determining whether the one or more OAM code blocks are locked or unlocked in following manners: for the first type of extraction opportunities, if i consecutive messages of the first type of extraction opportunities are found in expected positions, then entering a frame lock state; if messages of the first type of extraction opportunities are not found in j consecutive expected positions, then entering a frame unlock state; for the third type of extraction opportunities, if correct code blocks are received at expected positions of first code blocks of consecutive k CV messages, then entering the frame lock state; if a correct code block is not received at an expected position of a first code block of consecutive 1 CV message, then entering the frame unlock state; wherein, i, j, k are preset values.

A communication device includes: a processor configured to read a program in a memory and perform following: adopting code blocks carrying Metro Transport Network (MTN) path-layer Operations, Administration and Maintenance (OAM); inserting one or more path-layer OAM code blocks into a code block sequence with a nominal period of N; a transceiver configured to receive and transmit data under control of the processor.

During implementation, the code blocks are 64B/66B code blocks.

During implementation, positions where the one or more OAM code blocks are inserted are located in one or more InterPacket Gaps (IPG).

During implementation, $N=n\times16$ k, n is a quantity of calendar slots occupied by a path.

During implementation, one of the calendar slots is 5 Gbps.

During implementation, when the processor executes the program, the processor further implements: deleting, by the MTN path layer, Idle Blocks from the code block sequence as required, to compensate for insertion of the one or more OAM code blocks.

During implementation, the one or more OAM code blocks are Ordered Set blocks having Type=0x4B, O code=0xC.

During implementation, insertion opportunities when performing insertion include one or a combination of following types: a first type of insertion opportunities, the first type of opportunities being opportunities to insert path status and error monitoring information; a second type of insertion opportunities, the second type of opportunities being opportunities to insert Automatic Protection Switch (APS) information; a third type of insertion opportunities, the third type of insertion opportunities being opportunities to insert blocks in low priority messages.

During implementation, when the processor executes the program, the processor further implements: not using insertion opportunities for unavailable APS or low priority messages.

During implementation, a regular pattern of the third type of insertion opportunities is 64 insertion opportunities of the third type.

During implementation, in the regular pattern of the third type of insertion opportunities, messages are sent in one or a combination of following ways: sending Connectivity Verification (CV) messages in first to seventeenth allocated opportunities of the 64 opportunities; sending a Client Signal (CS) message at an eighteenth opportunity of the 64 opportunities; sending a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

During implementation, the 1DM message and the 2DMM message are sent when a system request exists.

During implementation, the 2DMR message is sent in response to a received 2DMM message.

During implementation, no message is sent in the reserved opportunities.

During implementation, when the processor executes the program, the processor further implements: determining whether the one or more OAM code blocks are locked or unlocked in following manners: for the first type of insertion opportunities, if i consecutive messages of the first type of insertion opportunities are found in expected positions, then entering a frame lock state; if messages of the first type of insertion opportunities are not found in j consecutive expected positions, then entering a frame unlock state; for the third type of insertion opportunities, if correct code blocks are received at expected positions of first code blocks of consecutive k CV messages, then entering the frame lock state; if a correct code block is not received at an expected position of a first code block of consecutive 1 CV message, then entering the frame unlock state; wherein, i, j, k are preset values.

A communication device includes a carrying module configured for adopting code blocks carrying Metro Transport Network (MTN) path-layer Operations, Administration and Maintenance (OAM); an insertion module configured for inserting one or more path-layer OAM code blocks into a code block sequence with a nominal period of N.

During implementation, the carrying module is further configured to enable the code blocks to be 64B/66B code blocks.

During implementation, the insertion module is further configured to enable positions where the one or more OAM code blocks are inserted to be located in one or more InterPacket Gaps (IPG).

During implementation, N=n×16 k, n is a quantity of calendar slots occupied by a path.

During implementation, one of the calendar slots is 5 Gbps.

During implementation, the insertion module is further configured to enable the MTN path layer to delete Idle Blocks from the code block sequence as required, to compensate for insertion of the one or more OAM code blocks.

During implementation, the one or more OAM code blocks are Ordered Set blocks having Type=0x4B, O code=0xC.

During implementation, the insertion module is further configured to enable insertion opportunities to include one or a combination of following types: a first type of insertion opportunities, the first type of opportunities being opportunities to insert path status and error monitoring information; a second type of insertion opportunities, the second type of opportunities being opportunities to insert Automatic Protection Switch (APS) information; a third type of insertion opportunities, the third type of insertion opportunities being opportunities to insert blocks in low priority messages.

During implementation, the insertion module is further configured to not use insertion opportunities for unavailable APS or low priority messages.

During implementation, a regular pattern of the third type of insertion opportunities is 64 insertion opportunities of the third type.

During implementation, the insertion module is further configured to, in the regular pattern of the third type of insertion opportunities, send messages in one or a combination of following ways: sending Connectivity Verification (CV) messages in first to seventeenth allocated opportunities of the 64 opportunities; sending a Client Signal (CS) message at an eighteenth opportunity of the 64 opportunities; sending a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

During implementation, the insertion module is further configured to send the 1DM message and the 2DMM message when a system request exists.

During implementation, the insertion module is further configured to send the 2DMR message in response to a received 2DMM message.

During implementation, the insertion module is further configured to not send a message in the reserved opportunities.

During implementation, the insertion module is further configured to: determine whether the one or more OAM code blocks are locked or unlocked in following manners: for the first type of insertion opportunities, if i consecutive messages of the first type of insertion opportunities are found in expected positions, then entering a frame lock state; if messages of the first type of insertion opportunities are not found in j consecutive expected positions, then entering a frame unlock state; for the third type of insertion opportunities, if correct code blocks are received at expected positions of first code blocks of consecutive k CV messages, then entering the frame lock state; if a correct code block is not received at an expected position of a first code block of consecutive 1CV message, then entering the frame unlock state; wherein, i, j, k are preset values.

A communication device includes: a processor configured to read a program in a memory and perform following: adopting code blocks carrying Metro Transport Network (MTN) path-layer Operations, Administration and Maintenance (OAM); extracting one or more path-layer OAM code blocks from a code block sequence with a nominal period of N; a transceiver configured to receive and transmit data under control of the processor.

During implementation, the code blocks are 64B/66B code blocks.

During implementation, positions where the one or more OAM code blocks are extracted are located in one or more InterPacket Gaps (IPG).

During implementation, N=n×16 k, n is a quantity of calendar slots occupied by a path.

During implementation, one of the calendar slots is 5 Gbps.

During implementation, when the processor executes the program, the processor further implements: inserting, by the MTN path layer, Idle Blocks into the code block sequence as required, to compensate for extraction of the one or more OAM code blocks.

During implementation, the one or more OAM code blocks are Ordered Set blocks having Type=0x4B, O code=0xC.

During implementation, extraction opportunities when performing extraction include one or a combination of following types: a first type of extraction opportunities, the first type of opportunities being opportunities to extract path status and error monitoring information; a second type of extraction opportunities, the second type of opportunities being opportunities to extract Automatic Protection Switch (APS) information; a third type of extraction opportunities, the third type of extraction opportunities being opportunities to extract blocks from low priority messages.

During implementation, when the processor executes the program, the processor further implements: not performing extraction from unavailable APS or low priority messages.

During implementation, a regular pattern of the third type of extraction opportunities is 64 extraction opportunities of the third type.

During implementation, in the regular pattern of the third type of extraction opportunities, messages are received in one or a combination of following ways: receiving Connectivity Verification (CV) messages in first to seventeenth allocated opportunities of the 64 opportunities; receiving a Client Signal (CS) message at an eighteenth opportunity of the 64 opportunities; receiving a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

During implementation, the 1DM message and the 2DMM message are received when a system request exists.

During implementation, the 2DMR message is received in response to a sent 2DMM message.

During implementation, no message is received in the reserved opportunities.

During implementation, when the processor executes the program, the processor further implements: determining whether the one or more OAM code blocks are locked or unlocked in following manners: for the first type of extraction opportunities, if i consecutive messages of the first type of extraction opportunities are found in expected positions, then entering a frame lock state; if messages of the first type of extraction opportunities are not found in j consecutive expected positions, then entering a frame unlock state; for the third type of extraction opportunities, if correct code blocks are received at expected positions of first code blocks of consecutive k CV messages, then entering the frame lock state; if a correct code block is not received at an expected position of a first code block of consecutive 1 CV message, then entering the frame unlock state; wherein, i, j, k are preset values.

A communication device includes: a carrying module configured for adopting code blocks to carry Metro Transport Network (MTN) path-layer Operations, Administration and Maintenance (OAM); an extraction module configured for extracting one or more path-layer OAM code blocks from a code block sequence with a nominal period of N.

During implementation, the carrying module is further configured to enable the code blocks to be 64B/66B code blocks.

During implementation, the extraction module is further configured to enable positions where the one or more OAM code blocks are extracted to be located in one or more InterPacket Gaps (IPG).

During implementation, N=n×16 k, n is a quantity of calendar slots occupied by a path.

During implementation, one of the calendar slots is 5 Gbps.

During implementation, the extraction is further configured to enable the MTN path layer to insert Idle Blocks into the code block sequence as required, to compensate for extraction of the one or more OAM code blocks.

During implementation, the one or more OAM code blocks are Ordered Set blocks having Type=0x4B, O code=0xC.

During implementation, extraction opportunities when performing extraction include one or a combination of following types: a first type of extraction opportunities, the first type of opportunities being opportunities to extract path status and error monitoring information; a second type of extraction opportunities, the second type of opportunities being opportunities to extract Automatic Protection Switch (APS) information; a third type of extraction opportunities, the third type of extraction opportunities being opportunities to extract blocks from low priority messages.

During implementation, the extraction module is further configured to not perform extraction from unavailable APS or low priority messages.

During implementation, a regular pattern of the third type of extraction opportunities is 64 extraction opportunities of the third type.

During implementation, the extraction module is further configured to, in the regular pattern of the third type of extraction opportunities, receive messages in one or a combination of following ways: receiving Connectivity Verification (CV) messages in first to seventeenth allocated opportunities of the 64 opportunities; receiving a Client Signal (CS) message at an eighteenth opportunity of the 64 opportunities; receiving a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

During implementation, the extraction module is further configured to receive the 1DM message and the 2DMM message when a system request exists.

During implementation, the extraction module is further configured to receive the 2DMR message in response to a sent 2DMM message.

During implementation, the extraction module is further configured to not receive a message in the reserved opportunities.

During implementation, the extraction module is further configured to determine whether the one or more OAM code blocks are locked or unlocked in following manners: for the first type of extraction opportunities, if i consecutive messages of the first type of extraction opportunities are found in expected positions, then entering a frame lock state; if messages of the first type of extraction opportunities are not found in j consecutive expected positions, then entering a frame unlock state; for the third type of extraction opportunities, if correct code blocks are received at expected positions of first code blocks of consecutive k CV messages, then entering the frame lock state; if a correct code block is not received at an expected position of a first code block of consecutive 1 CV message, then entering the frame unlock state; wherein, i, j, k are preset values.

A computer-readable storage medium storing a computer program for performing the OAM insertion method at a sending end and/or the OAM extraction method at a sending end.

The beneficial effects of the present disclosure are as follows:

In the technical solutions provided by the embodiments of the present disclosure, since the MTN path-layer OAM is carried by code blocks, and the one or more OAM code blocks are inserted into the code block sequence with N as the nominal period, it solves the problem of OAM code block insertion when various OAM messages are transmitted by the MTN network. Furthermore, a mechanism for periodically inserting different types of OAM messages is provided. Furthermore, a double lock mechanism is provided. Therefore, a correct operation of the OAM mechanism of the MTN network is guaranteed.

BRIEF DESCRIPTION OF THE DRAWINGS

The drawings described here are used to provide a further understanding of the present disclosure, and constitute a part of the present disclosure. The schematic embodiments of the present disclosure and their descriptions are used to explain the present disclosure, and do not constitute improper limitations to the present disclosure.

DETAILED DESCRIPTION

The inventor noticed during devising invention that: there is currently no solution to one of the following problems: how to insert one or more OAM code blocks, how to send different OAM messages with different priorities, how to lock and unlock, etc. need to be solved.

Based on the above, the embodiments of the present disclosure provide OAM insertion and OAM extraction solutions at the sending end.

The specific implementation manners of the present disclosure will be described below in conjunction with the accompanying drawings.

During description, implementations at an insertion end and an extraction end will be described respectively, and then an example of cooperation between the insertion end and the extraction end will be given to better understand the implementations of the solutions given in the embodiments of the present disclosure. This explanation does not mean that the two ends must be implemented together, or must be implemented separately. In fact, when the insertion end and the extraction end are implemented separately, they also solve the problems existing at their respective end. When the two ends are used in combination, better technical results will be obtained.

1. Implementation of an OAM Insertion Mechanism at the Sending End.

Figure 1:
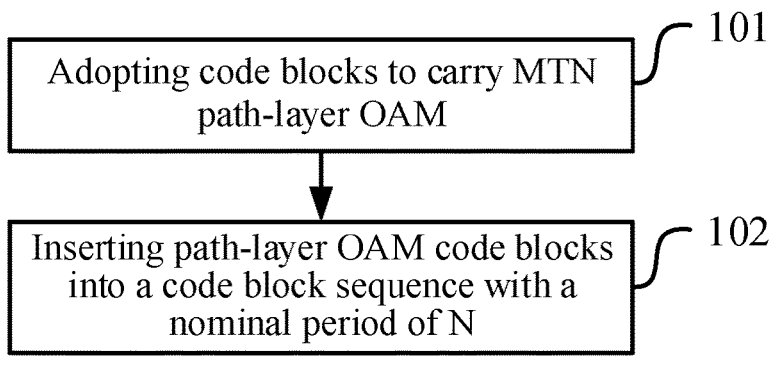
FIG. 1 is a schematic diagram of an implementation flow of an OAM insertion method at a sending end according to the embodiments of the present disclosure.

FIG. 1 is a schematic diagram of an implementation process of the OAM insertion method at the sending end, as shown in the figure. The method may include:

Step 101: adopting a code block to carry MTN path-layer OAM;

Step 102: inserting one or more path-layer OAM code blocks into a code block sequence with a nominal period of N.

During implementation, the code blocks are 64B/66B code blocks.

Specifically, MTN (Metro transport network) path-layer OAM (Operations, Administration and Maintenance) is carried by 64B/66B code blocks, and the one or more path-layer OAM code blocks are inserted into a 64B/66B code block sequence with a nominal period of N.

Positions where the one or more OAM code blocks are inserted are located in one or more InterPacket Gaps (IPG). N=n×16 k, n is the number of calendar slots occupied by the path; wherein, the calendar slots may be 5 Gbps.

The MTN path layer deletes idle blocks (Idle Blocks) from the code block sequence as required, to compensate for the insertion of the one or more OAM code blocks.

Specifically, the MTN path layer deletes idle blocks (Idle Blocks) from the 64B/66B code block sequence as required, to compensate for the insertion of path-layer OAM;

The one or more OAM code blocks are ordered set blocks (Ordered Set block) of Type=0x4B, O code=0xC.

Figure 2:
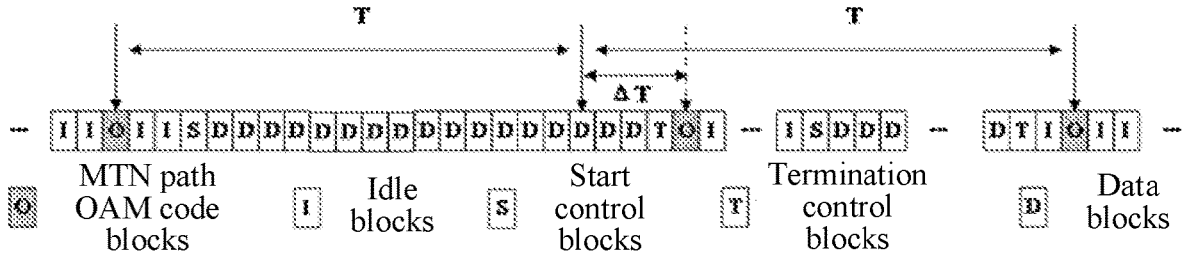
FIG. 2 is a schematic diagram of MTNP OAM block insertion according to the embodiments of the present disclosure.

That is, Path OAM insertion (path OAM insertion):

Path OAM blocks are inserted into the client block sequence with a nominal period of n×16K blocks, where n is the number of 5 Gbit/s calendar slots that the path occupies. The actual insertion of each OAM block is delayed from the nominal insertion point so that the OAM block falls in the interpacket gap as shown in FIG. 2. Delaying insertion of a block does not change the nominal insertion point of the next block. Idle blocks are removed as necessary from the client block sequence to compensate for the insertion of the path OAM. FIG. 2 MTNP OAM block insertion illustration.

During implementation, insertion opportunities at the time of insertion include one or a combination of the following types:

a first type of insertion opportunities, the first type of opportunities being opportunities to insert path status and error monitoring information;

a second type of insertion opportunities, the second type of opportunities being opportunities to insert APS information;

a third type of insertion opportunities, the third type of insertion opportunities being opportunities to insert blocks from low priority messages.

Figure 3:
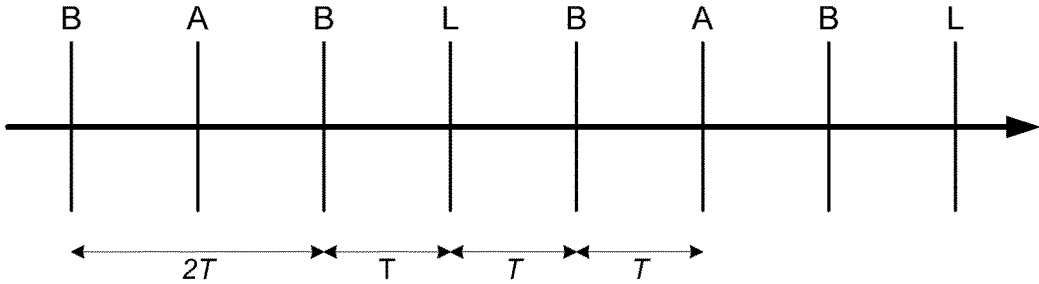
FIG. 3 is a schematic diagram of an insertion opportunity pattern according to the embodiments of the present disclosure.

Specifically, FIG. 3 is a schematic diagram of an insertion opportunity pattern, as shown in the figure, the insertion mechanism follows a regular insertion opportunity mechanism, which divides insertion opportunities into three types, i.e., the first type, the second type and the third type. The insertion pattern is shown in FIG. 3. B (the first type) indicates the path status and error monitoring information, A (the second type) indicates the opportunity to insert APS (Automatic Protection Switch) information, and L (the third type) indicates an opportunity to insert blocks (if any) from a lower priority message.

During implementation, the method may further include: not using insertion opportunities for unavailable APS or low priority messages.

Specifically, if APS or low priority messages are not available, no messages will be transmitted in these opportunities.

Figure 4:
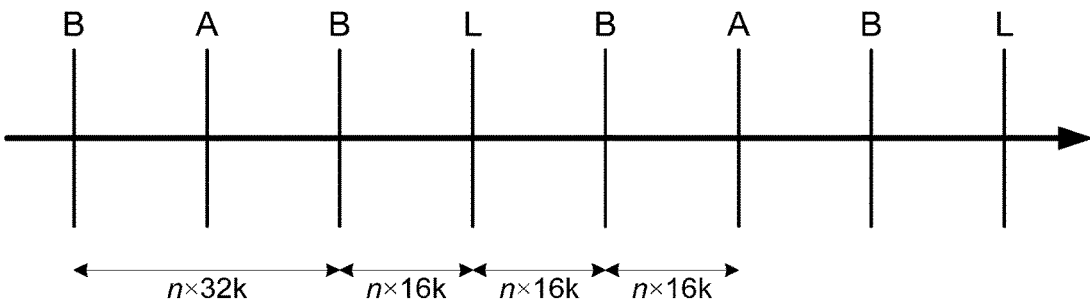
FIG. 4 is a schematic diagram of an insertion opportunity pattern according to the embodiments of the present disclosure.

That is, the insertion follows a regular pattern of opportunities as shown in FIG. 4. B represents path status and error monitoring information, A represents an opportunity to insert APS information, and L represents an opportunity to insert a block from a low priority message if one is available. If an APS or low priority message is not available, nothing is transmitted in those opportunities. FIG. 4 Pattern of insertion opportunities.

During implementation, the regular pattern of the third type of insertion opportunities is 64 insertion opportunities of the third type.

During implementation, in the regular pattern of the third type of insertion opportunities, the message is sent in one or a combination of the following ways:

CV messages are sent in the first to seventeenth allocated opportunities of the 64 opportunities;

a CS message is sent at the eighteenth opportunity of the 64 opportunities;

1DM or 2DMM or 2DMR messages are sent in the nineteenth to the thirty-first allocated opportunities of the 64 opportunities;

the thirty-second to sixth-fourth opportunities of the 64 opportunities are reserved (Reserved).

Specifically, the third type of messages follows a regular insertion opportunity mechanism, with 64 insertion opportunities of the third type being taken as a regular pattern. Allocation of the insertion opportunities is shown in Table 1 below:

TABLE 1

| Sequence number of the third type of opportunities (Low priority opportunity) | Message type (Message) |
| --- | --- |
| 1-17 | CV |
| 18 | CS |
| 19-31 | 1DM/2DMM/2DMR |
| 32-64 | Reserved |

CV (Connectivity Verification) and CS (Client Signal) messages will be sent in every opportunity allocated in the above table.

1DM (one-way delay measurement) and 2DMM (two-way delay measurement message) messages are sent only when a system request exists.

2DMR (two-way delay measurement response) message is sent in response to the received 2DMM message.

No message is sent in the reserved opportunities.

That is, the sequence of low priority opportunities follows a regular pattern of 64 opportunities, as shown in Table 1. This results in an overall cycle of 256 OAM blocks.

The CV and CS messages are sent at every opportunity. 1DM and 2DMM messages are sent when requested by the management system. 2DMR messages are sent in response to receiving a 2DMM message.

Nothing is sent in the reserved opportunities.

The use of a regular pattern of opportunities enables the receiver to synchronize to the pattern and know what type of OAM block to expect.

Two levels of frame lock are defined. The first level is alignment with the high-level pattern shown in FIG. 2. The in-frame state is entered if 2 consecutive pieces of path status and error monitoring information are found in the expected location. The out of frame state is entered if path status and error monitoring information is not found in 5 consecutive expected locations.

The second level of alignment is to the low priority opportunities. The in-frame state is entered if the first block of the CV message is found in the expected position 2 consecutive cycles of 256 OAM blocks. The out of frame state is entered if the first block of the CV message is not found in the expected position in 3 consecutive cycles of 256 OAM blocks.

During implementation, the method may further include determining whether the one or more OAM code blocks are locked or unlocked in the following manner:

for the first type of insertion opportunities, if i consecutive messages of the first type of insertion opportunities in expected positions are found, then entering a frame lock state; if the messages of the first type of insertion opportunities are not found in j consecutive expected positions, then entering a frame unlock state;

for the third type of insertion opportunities, if a correct code block can be received at the expected position of the first code block of consecutive k CV messages, then entering the frame lock state; if a correct code block is not received at the expected position of the first code block of consecutive 1 CV message, then entering the frame unlock state; wherein, i, j, k are preset values.

Specifically, the OAM frame lock/unlock judgment mechanism may be as follows. Two-level frame lock mechanism:

a first level: for the first type of insertion opportunities, if i consecutive messages of the first type of insertion opportunities are found in the expected positions, then entering the frame lock state; if messages of the first type of insertion opportunities are not found at j consecutive expected positions, then entering the frame unlock state;

a second level: for the third type of insertion opportunities, if a correct code block can be received at the expected positions of the first code blocks of consecutive k CV messages, then entering the frame lock state; if a correct code block cannot be received at the expected position of the first code block of consecutive 1 CV message, then entering the frame unlock state.

2. Implementation of an OAM Extraction Mechanism at a Sending End.

A path OAM is identified based on ordered sets having O-code=0xC. Blocks matching this characteristic are extracted from a received block sequences and processed as OAM blocks. To compensate for deleted OAM blocks, idle blocks are inserted into the block sequence to keep the clock constant. Description is given below.

Figure 5:
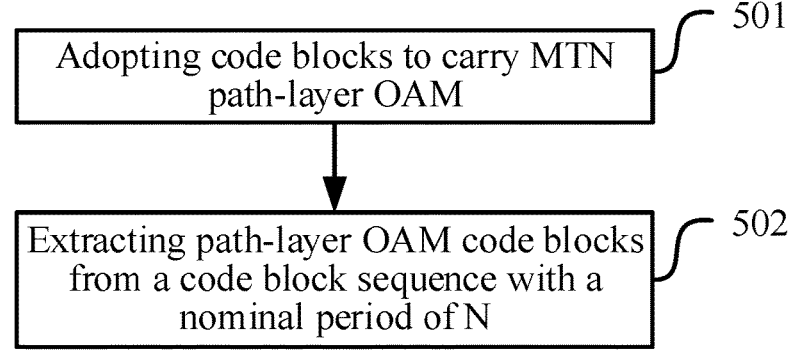
FIG. 5 is a schematic diagram of an implementation flow of an OAM extraction method at a sending end according to the embodiments of the present disclosure.

FIG. 5 is a schematic diagram of the implementation process of the OAM extraction method at the sending end, as shown in the figure, the method may include:

Step 501: adopting code blocks to carry MTN path-layer OAM;

Step 502: extracting one or more path-layer OAM code blocks from a code block sequence with a nominal period of N.

During implementation, the code blocks are 64B/66B code blocks.

That is, Path OAM extraction

The path OAM is recognized based on the block being an ordered set with O-code 0xC. Blocks matching this signature are extracted from the received block sequence and processed as OAM blocks. To compensate for the removed OAM blocks, idle blocks are inserted into the block sequence to maintain the same clock.

During implementation, positions where the one or more OAM code blocks are extracted are located in one or more InterPacket Gaps (IPG).

During implementation, N=n×16 k, n is the number of calendar slots occupied by the path.

During implementation, the calendar slot is 5 Gbps.

During implementation, the method further includes: inserting, by the MTN path layer, idle blocks (Idle Blocks) in the code block sequence as required, to compensate for the extraction of the one or more OAM code blocks.

During implementation, the one or more OAM code blocks are ordered set blocks (Ordered Set block) with Type=0x4B, O code=0xC.

During implementation, the extraction opportunities at the time of extraction include one or a combination of the following types:

a first type of extraction opportunities, the first type of opportunities being opportunities to extract path status and error monitoring information;
   a second type of extraction opportunities, the second type of opportunities being opportunities to extract APS information;
   a third type of extraction opportunities, the third type of opportunities being opportunities to extract blocks from low priority messages.

During implementation, the method further includes: not extracting unavailable APS or low priority messages.

During implementation, the regular pattern of the third type of extraction opportunities is 64 extraction opportunities of the third type.

During implementation, in the regular pattern of the third type of extraction opportunities, the message is received in one or a combination of the following ways:

CV messages are received in the first to seventeenth allocated opportunities of the 64 opportunities;
   a CS message is received at the eighteenth opportunity of the 64 opportunities;
   1DM or 2DMM or 2DMR messages are received in the nineteenth to the thirty-first allocated opportunities of the 64 opportunities;
   the thirty-second to sixth-fourth opportunities of the 64 opportunities are reserved (Reserved).

During implementation, 1DM and 2DMM messages are received when a system request exists. A received 2DMR message is in response to a 2DMM message that is sent.

During implementation, a message is not received in the reserved opportunities.

During implementation, the method further includes: determining whether the one or more OAM code blocks are locked or unlocked in the following manner:

for the first type of extraction opportunities, if i consecutive messages of the first type of extraction opportunities are found in expected positions, then entering a frame lock state; if the messages of the first type of extraction opportunities are not found in j consecutive expected positions, then entering a frame unlock state;
   for the third type of insertion opportunities, if a correct code block can be received at the expected positions of the first code blocks of consecutive k CV messages, then entering the frame lock state; if a correct code block is not received at the expected position of the first code block of consecutive 1 CV message, then entering the frame unlock state; wherein, i, j, k are preset values.

Based on the same inventive concept, embodiments of the present disclosure also provide a communication device and a computer-readable storage medium. Since the principle of solving problems by these devices is similar to the method of inserting OAM at the sending end and the method of extracting OAM at the sending end, the implementations of these devices may be obtained by referring to the implementation of the methods, and repeated descriptions will not be repeated.

When implementing the technical solutions provided by the embodiments of the present disclosure, the technical solutions may be implemented in the following manner.

Figure 6:
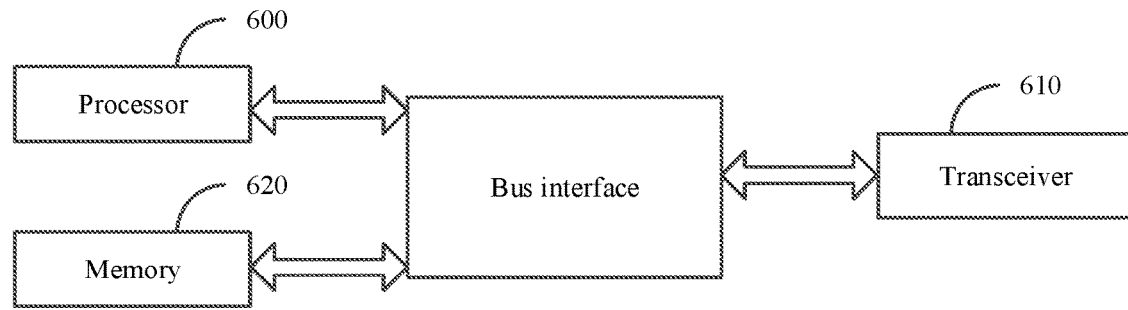
FIG. 6 is a schematic structural diagram of a communication device 1 according to the embodiments of the present disclosure.

FIG. 6 is a schematic structural diagram of a communication device 1. As shown in the figure, the base station includes a processor 600, a memory 620 and a transceiver 620. The processor 600 is configured to read a program in the memory 620 to execute following processes:

adopting code blocks to carry MTN path-layer OAM;
   inserting one or more path-layer OAM code blocks into a code block sequence with a nominal period of N.

The transceiver 610 is configured for receiving and sending data under the control of the processor 600.

During implementation, the code blocks are 64B/66B code blocks.

During implementation, positions where the one or more OAM code blocks are inserted are located in one or more InterPacket Gaps (IPG).

During implementation, N=n×16 k, n is the number of calendar slots occupied by the path.

During implementation, the calendar slot is 5 Gbps.

During implementation, the method further includes: deleting, by the MTN path layer, idle blocks (Idle Blocks) from the code block sequence as required, to compensate for the insertion of the one or more OAM code blocks.

During implementation, the one or more OAM code blocks are ordered set blocks (Ordered Set block) having Type=0x4B, O code=0xC.

During implementation, insertion opportunities at the time of insertion include one or a combination of the following types:

a first type of insertion opportunities, the first type of opportunities being opportunities to insert path status and error monitoring information;
   a second type of insertion opportunities, the second type of opportunities being opportunities to insert APS information;
   a third type of insertion opportunities, the third type of insertion opportunities being opportunities to insert blocks from low priority messages.

During implementation, the method further includes: not using insertion opportunities for unavailable APS or low priority messages.

During implementation, the regular pattern of the third type of insertion opportunities is 64 insertion opportunities of the third type.

During implementation, in the regular pattern of the third type of insertion opportunities, the message is sent in one or a combination of the following ways:

CV messages are sent in the first to seventeenth allocated opportunities of the 64 opportunities;
   a CS message is sent at the eighteenth opportunity of the 64 opportunities;

1DM or 2DMM or 2DMR messages are sent in the nineteenth to the thirty-first allocated opportunities of the 64 opportunities;

the thirty-second to sixth-fourth opportunities of the 64 opportunities are reserved (Reserved).

During implementation, 1DM and 2DMM messages are sent only when a system request exists.

During implementation, 2DMR message is sent in response to the received 2DMM message.

During implementation, no message is sent in the reserved opportunities.

During implementation, when the processor 600 executes the program, the processor 600 further implements: determining whether the one or more OAM code blocks are locked or unlocked in the following manner:

for the first type of insertion opportunities, if i consecutive messages of the first type of insertion opportunities are found in expected positions, then entering a frame lock state; if the messages of the first type of insertion opportunities are not found in j consecutive expected positions, then entering a frame unlock state;

for the third type of insertion opportunities, if a correct code block can be received at the expected positions of the first code blocks of consecutive k CV messages, then entering the frame lock state; if a correct code block is not received at the expected position of the first code block of consecutive 1 CV message, then entering the frame unlock state; wherein, i, j, k are preset values.

In FIG. 6, a bus architecture may include any number of interconnected buses and bridges, specifically various circuits such as one or more processors represented by the processor 600 and the memory represented by the memory 620 are linked together. The bus architecture can also link together various other circuits such as peripherals, voltage regulators, and power management circuits, etc., which are well known in the art and therefore will not be further described herein. The bus interface provides an interface. The transceiver 610 may be a plurality of elements, including a transmitter and a receiver, providing a means for communicating with various other devices over transmission media. The processor 600 is responsible for managing the bus architecture and general processing, and the memory 620 can store data used by the processor 600 when performing operations.

The embodiments of the present disclosure provide a communication device. The communication device includes: a carrying module, configured to adopt code blocks to carry MTN path-layer OAM; and an insertion module, configured to insert one or more path-layer OAM code blocks into a code block sequence with a nominal period of N.

During implementation, the carrying module is further configured to adopt 64B/66B code blocks.

During implementation, the insertion module is further configured to enable positions where the one or more OAM code blocks are inserted to be located in one or more InterPacket Gaps (IPG).

During implementation, N=n×16 k, n is the number of calendar slots occupied by the path.

During implementation, the calendar slot is 5 Gbps.

During implementation, the insertion module is further configured to: enable the MTN path layer to delete idle blocks (Idle Blocks) from the code block sequence as required, to compensate for the insertion of the one or more OAM code blocks.

During implementation, the one or more OAM code blocks are ordered set blocks (Ordered Set block) having Type=0x4B, O code=0xC.

During implementation, the insertion module is further configured to enable insertion opportunities at the time of insertion to include one or a combination of the following types:

a first type of insertion opportunities, the first type of opportunities being opportunities to insert path status and error monitoring information;

a second type of insertion opportunities, the second type of opportunities being opportunities to insert APS information;

a third type of insertion opportunities, the third type of insertion opportunities being opportunities to insert blocks from low priority messages.

During implementation, the insertion module is further configured to not use insertion opportunities for unavailable APS or low priority messages.

During implementation, the regular pattern of the third type of insertion opportunities is 64 insertion opportunities of the third type.

During implementation, the insertion module is further configured to send, in the regular pattern of the third type of insertion opportunities, the message in one or a combination of the following ways:

sending CV messages in the first to seventeenth allocated opportunities of the 64 opportunities;

sending a CS message at the eighteenth opportunity of the 64 opportunities;

sending 1DM or 2DMM or 2DMR messages in the nineteenth to the thirty-first allocated opportunities of the 64 opportunities;

wherein the thirty-second to sixth-fourth opportunities of the 64 opportunities are reserved (Reserved).

During implementation, the insertion module is further configured to send 1DM and 2DMM messages when a system request exists.

During implementation, the insertion module is further configured to send a 2DMR message in response to the received 2DMM message.

During implementation, the insertion module is further configured to not send a message in the reserved opportunities.

During implementation, the insertion module is further configured to determine whether the one or more OAM code blocks are locked or unlocked in the following manner:

for the first type of insertion opportunities, if i consecutive messages of the first type of insertion opportunities are found in expected positions, then entering a frame lock state; if the messages of the first type of insertion opportunities are not found in j consecutive expected positions, then entering a frame unlock state;

for the third type of insertion opportunities, if a correct code block can be received at the expected positions of the first code blocks of consecutive k CV messages, then entering the frame lock state; if a correct code block is not received at the expected position of the first code block of consecutive 1 CV message, then entering the frame unlock state; wherein, i, j, k are preset values.

For the convenience of description, various parts of the device described above are described by dividing functions into various modules or units respectively. Of course, when implementing the present disclosure, the functions of the modules or units can be implemented in one or more of software or hardware.

Figure 7:
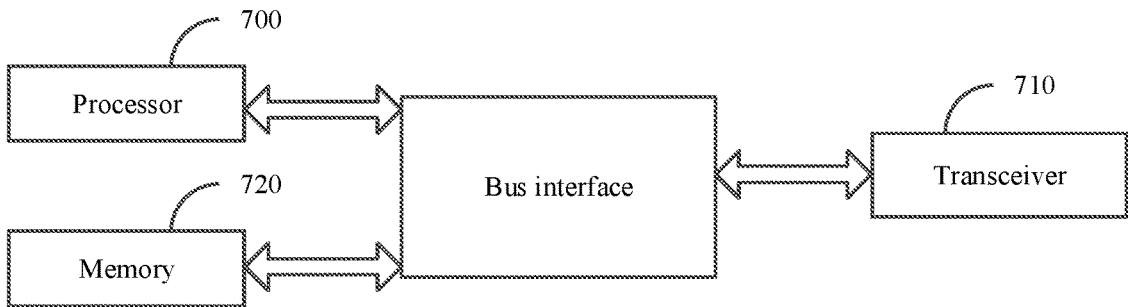
FIG. 7 is a schematic structural diagram of a communication device 2 according to the embodiments of the present disclosure.

FIG. 7 is a schematic structural diagram of a communication device 2. As shown in the figure, the base station includes a transceiver 710, a processor 700, and a memory 720.

The processor 700 is configured to read a program in the memory 720 and execute the following processes:

adopting code blocks to carry MTN path-layer OAM;

extracting one or more path-layer OAM code blocks from a code block sequence with a nominal period of N.

The transceiver 710 is configured to receive and send data under the control of the processor 700.

During implementation, the code blocks are 64B/66B code blocks.

During implementation, positions where the one or more OAM code blocks are extracted are located in one or more InterPacket Gaps (IPG).

During implementation, $N=n\times16$ k, n is the number of calendar slots occupied by the path.

During implementation, the calendar slot is 5 Gbps.

During implementation, when the processor 700 executes the program, the processor 700 further implements: enabling the MTN path layer to insert idle blocks (Idle Blocks) in the code block sequence as required, to compensate for the extraction of the one or more OAM code blocks.

During implementation, the one or more OAM code blocks are ordered set blocks (Ordered Set block) with Type=0x4B, O code=0xC.

During implementation, the extraction opportunities at the time of extraction include one or a combination of the following types:

a first type of extraction opportunities, the first type of opportunities being opportunities to extract path status and error monitoring information;

a second type of extraction opportunities, the second type of opportunities being opportunities to extract APS information;

a third type of extraction opportunities, the third type of opportunities being opportunities to extract blocks from low priority messages.

During implementation, when the processor 700 executes the program, the processor 700 further implements: not extracting unavailable APS or low priority messages.

During implementation, the regular pattern of the third type of extraction opportunities is 64 extraction opportunities of the third type.

During implementation, in the regular pattern of the third type of extraction opportunities, the message is received in one or a combination of the following ways:

CV messages are received in the first to seventeenth allocated opportunities of the 64 opportunities;

a CS message is received at the eighteenth opportunity of the 64 opportunities;

1DM or 2DMM or 2DMR messages are received in the nineteenth to the thirty-first allocated opportunities of the 64 opportunities;

the thirty-second to sixth-fourth opportunities of the 64 opportunities are reserved (Reserved).

During implementation, 1DM and 2DMM messages are received when a system request exists.

During implementation, a received 2DMR message is in response to a 2DMM message that is sent.

During implementation, a message is not received in the reserved opportunities.

During implementation, when the processor 700 executes the program, the processor 700 further implements: determining whether the one or more OAM code blocks are locked or unlocked in the following manners:

for the first type of extraction opportunities, if i consecutive messages of the first type of extraction opportunities are found in expected positions, then entering a frame lock state; if the messages of the first type of extraction opportunities are not found in j consecutive expected positions, then entering a frame unlock state;

for the third type of insertion opportunities, if a correct code block can be received at the expected positions of the first code blocks of consecutive k CV messages, then entering the frame lock state; if a correct code block is not received at the expected position of the first code block of consecutive 1CV message, then entering the frame unlock state; wherein, i, j, k are preset values.

In FIG. 7, a bus architecture may include any number of interconnected buses and bridges, specifically various circuits such as one or more processors represented by the processor 700 and the memory represented by the memory 720 are linked together. The bus architecture can also link together various other circuits such as peripherals, voltage regulators, and power management circuits, etc., which are well known in the art and therefore will not be further described herein. The bus interface provides an interface. The transceiver 710 may be a plurality of elements, including a transmitter and a receiver, providing a means for communicating with various other devices over transmission media. The processor 700 is responsible for managing the bus architecture and general processing, and the memory 720 can store data used by the processor 700 when performing operations.

The embodiments of the present disclosure also provide a communication device. The communication device includes: a carrying module, configured to adopt code blocks to carry MTN path-layer OAM; and an extraction module, configured to extract one or more path-layer OAM code blocks from a code block sequence with a nominal period of N.

During implementation, the carrying module is further configured to adopt 64B/66B code blocks.

During implementation, the carrying module is further configured to enable positions where the one or more OAM code blocks are extracted to be located in one or more InterPacket Gaps (IPG).

During implementation, $N=n\times16$ k, n is the number of calendar slots occupied by the path.

During implementation, the calendar slot is 5 Gbps.

During implementation, the extraction module is further configured to enable the MTN path layer to insert idle blocks (Idle Blocks) in the code block sequence as required, to compensate for the extraction of the one or more OAM code blocks.

During implementation, the one or more OAM code blocks are ordered set blocks (Ordered Set block) with Type=0x4B, O code=0xC.

During implementation, the extraction opportunities at the time of extraction include one or a combination of the following types:

a first type of extraction opportunities, the first type of opportunities being opportunities to extract path status and error monitoring information;

a second type of extraction opportunities, the second type of opportunities being opportunities to extract APS information;

a third type of extraction opportunities, the third type of opportunities being opportunities to extract blocks from low priority messages.

During implementation, the extraction module is further configured to not extract unavailable APS or low priority messages.

During implementation, the regular pattern of the third type of extraction opportunities is 64 extraction opportunities of the third type.

During implementation, in the regular pattern of the third type of extraction opportunities, the message is received in one or a combination of the following ways:

CV messages are received in the first to seventeenth allocated opportunities of the 64 opportunities;

a CS message is received at the eighteenth opportunity of the 64 opportunities;

1DM or 2DMM or 2DMR messages are received in the nineteenth to the thirty-first allocated opportunities of the 64 opportunities;

the thirty-second to sixth-fourth opportunities of the 64 opportunities are reserved (Reserved).

During implementation, the extraction module is further configured to receive 1DM and 2DMM messages when a system request exists.

During implementation, the extraction module is further configured to receive a 2DMR message which is in response to a 2DMM message that is sent.

During implementation, the extraction module is further configured to not receive a message in the reserved opportunities.

During implementation, the extraction module is further configured to: determine whether the one or more OAM code blocks are locked or unlocked in the following manners:

for the first type of extraction opportunities, if i consecutive messages of the first type of extraction opportunities are found in expected positions, then entering a frame lock state; if the messages of the first type of extraction opportunities are not found in j consecutive expected positions, then entering a frame unlock state;

for the third type of insertion opportunities, if a correct code block can be received at the expected positions of the first code blocks of consecutive k CV messages, then entering the frame lock state; if a correct code block is not received at the expected position of the first code block of consecutive 1CV message, then entering the frame unlock state; wherein, i, j, k are preset values.

For the convenience of description, various parts of the device described above are described by dividing functions into various modules or units respectively. Of course, when implementing the present disclosure, the functions of the modules or units can be implemented in one or more of software or hardware.

A computer-readable storage medium, where the computer-readable storage medium stores a computer program for executing the above OAM insertion method and/or the above OAM extraction method at the sending end.

Specific implementation may be obtained by referring to implementation of the OAM insertion method at the sending end and/or the OAM extraction method at the sending end.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of a computer program product embodied on one or more computer-usable storage media (including but not limited to magnetic disk storage, optical storage, etc.) having computer-usable program code embodied therein.

The present disclosure is described with reference to flowcharts and/or block diagrams of methods, apparatus (systems), and computer program products according to embodiments of the present disclosure. It should be understood that each step in the flowchart and/or each block in the block diagram, and combinations of steps in the flowchart and/or blocks in the block diagram can be realized by computer program instructions. These computer program instructions may be provided to a general purpose computer, special purpose computer, embedded processor, or a processor of other programmable data processing equipment to produce a machine such that the instructions executed by the processor of the computer or other programmable data processing equipment produce a means for realizing the functions specified in one or more steps of the flowchart and/or one or more blocks of the block diagram.

These computer program instructions may also be stored in a computer-readable memory capable of directing a computer or other programmable data processing apparatus to operate in a specific manner, such that the instructions stored in the computer-readable memory produce an article of manufacture including instruction means, the instructions means realizes the function specified in one or more steps of the flowchart and/or one or more blocks of the block diagram.

These computer program instructions can also be loaded onto a computer or other programmable data processing device, causing a series of operational steps to be performed on the computer or other programmable device to produce a computer-implemented process, thereby instructions implemented by a computer or other programmable device provide steps for implementing the functions specified in the flow of the flow chart and/or one or more blocks in the block diagram.

Obviously, those skilled in the art can make various changes and modifications to the present disclosure without departing from the spirit and scope of the present disclosure. Thus, if these modifications and variations of the present disclosure fall within the scope and equivalent technologies of the claims of the present disclosure, the present disclosure also intends to include these changes and modifications.

What is claimed is:

1. An Operations, Administration and Maintenance (OAM) insertion method at a sending end, comprising:

adopting code blocks to carry Metro Transport Network (MTN) path-layer OAM;

inserting one or more path-layer OAM code blocks into a code block sequence with a nominal period of N, wherein positions where the one or more OAM code blocks are inserted are located in one or more Inter-Packet Gaps (IPG);

or, N=n×16 k, n is a quantity of calendar slots occupied by a path, wherein insertion opportunities when performing insertion comprise a third type of insertion opportunities, the third type of insertion opportunities being opportunities to insert blocks in low priority messages, wherein a regular pattern of the third type of insertion opportunities is 64 insertion opportunities of the third type, wherein, in the regular pattern of the third type of insertion opportunities, messages are sent in one or a combination of following ways:

sending Connectivity Verification (CV) messages in first to seventeenth allocated opportunities of the 64 opportunities;

sending a Capability Set (CS) message at an eighteenth opportunity of the 64 opportunities;

sending a one-way delay measurement (1DM) message or a two-way delay measurement message (2DMM) or a two-way delay measurement response (2DMR) message in nineteenth to thirty-first allocated opportunities of the 64 opportunities;

thirty-second to sixth-fourth opportunities of the 64 opportunities are reserved.

2. The method according to claim 1, wherein the code blocks are 64B/66B code blocks.

3. The method according to claim 1, wherein the method further comprises:

deleting, by the MTN path layer, Idle Blocks from the code block sequence as required, to compensate for insertion of the one or more OAM code blocks; and/or, the one or more OAM code blocks are Ordered Set blocks having Type=0x4B, O code=0xC.

4. The method according to claim 1, wherein insertion opportunities when performing insertion further comprise one or a combination of following types:

a first type of insertion opportunities, the first type of opportunities being opportunities to insert path status and error monitoring information; and a second type of insertion opportunities, the second type of opportunities being opportunities to insert Automatic Protection Switch (APS) information.

5. The method according to claim 4, further comprising:

not using insertion opportunities for unavailable APS or low priority messages.

6. The method according to claim 4, further comprising:

determining whether the one or more OAM code blocks are locked or unlocked in following manners:

for the first type of insertion opportunities, if i consecutive messages of the first type of insertion opportunities are found in expected positions, then entering a frame lock state; if messages of the first type of insertion opportunities are not found in j consecutive expected positions, then entering a frame unlock state;

for the third type of insertion opportunities, if correct code blocks are received at expected positions of first code blocks of consecutive k CV messages, then entering the frame lock state; if a correct code block is not received at an expected position of a first code block of consecutive l CV message, then entering the frame unlock state; wherein, i, j, k are preset values.

7. The method according to claim 1, wherein the 1DM message and the 2DMM message are sent when a system request exists; or, the 2DMR message is sent in response to a received 2DMM message; or no message is sent in the reserved opportunities.

8. An Operations, Administration and Maintenance (OAM) extraction method at a sending end, comprising:

adopting code blocks to carry Metro Transport Network (MTN) path-layer OAM;

extracting one or more path-layer OAM code blocks from a code block sequence with a nominal period of N, wherein positions where the one or more OAM code blocks are extracted are located in one or more Inter-Packet Gaps (IPG);

or, N=n×16 k, n is a quantity of calendar slots occupied by a path, wherein extraction opportunities when performing extraction comprise a third type of extraction opportunities, the third type of extraction opportunities being opportunities to extract blocks from low priority messages, wherein a regular pattern of the third type of extraction opportunities is 64 extraction opportunities of the third type, wherein, in the regular pattern of the third type of extraction opportunities, messages are received in one or a combination of following ways:

receiving Connectivity Verification (CV) messages in first to seventeenth allocated opportunities of the 64 opportunities;

receiving a Client Signal (CS) message at an eighteenth opportunity of the 64 opportunities;

receiving a one-way delay measurement (1DM) message or a two-way delay measurement message (2DMM) or a two-way delay measurement response (2DMR) message in nineteenth to thirty-first allocated opportunities of the 64 opportunities;

thirty-second to sixth-fourth opportunities of the 64 opportunities are reserved.

9. The method according to claim 8, wherein the code blocks are 64B/66B code blocks.

10. The method according to claim 8, wherein, the method further comprises:

inserting, by the MTN path layer, Idle Blocks into the code block sequence as required, to compensate for extraction of the one or more OAM code blocks; and/or, the one or more OAM code blocks are Ordered Set blocks having Type=0x4B, O code=0xC.

11. The method according to claim 8, wherein extraction opportunities when performing extraction further comprise one or a combination of following types:

a first type of extraction opportunities, the first type of opportunities being opportunities to extract path status and error monitoring information; or a second type of extraction opportunities, the second type of opportunities being opportunities to extract Automatic Protection Switch (APS) information.

12. The method according to claim 11, further comprising:

not performing extraction from unavailable APS or low priority messages.

13. The method according to claim 11, further comprising:

determining whether the one or more OAM code blocks are locked or unlocked in following manners:

for the first type of extraction opportunities, if i consecutive messages of the first type of extraction opportunities are found in expected positions, then entering a frame lock state; if messages of the first type of extraction opportunities are not found in j consecutive expected positions, then entering a frame unlock state;

for the third type of extraction opportunities, if correct code blocks are received at expected positions of first code blocks of consecutive k CV messages, then entering the frame lock state; if a correct code block is not received at an expected position of a first code block of consecutive l CV message, then entering the frame unlock state; wherein, i, j, k are preset values.

14. The method according to claim 8, wherein the 1DM message and the 2DMM message are received when a system request exists;

or, the 2DMR message is received in response to a sent 2DMM message;

or, no message is received in the reserved opportunities.

15. A communication device, comprising:

a processor configured to read a program in a memory and perform steps of the method according to claim 8;

a transceiver configured to receive and transmit data under control of the processor.

16. A communication device, comprising:

a processor configured to read a program in a memory and perform following:

adopting code blocks to carry Metro Transport Network (MTN) path-layer Operations, Administration and Maintenance (OAM);

inserting one or more path-layer OAM code blocks into a code block sequence with a nominal period of N;

a transceiver configured to receive and transmit data under control of the processor, wherein positions where the one or more OAM code blocks are extracted are located in one or more Inter-Packet Gaps (IPG);

or, $N=n\times16$ k, n is a quantity of calendar slots occupied by a path, wherein insertion opportunities when performing insertion comprise a third type of insertion opportunities, the third type of insertion opportunities being opportunities to insert blocks in low priority messages, wherein a regular pattern of the third type of insertion opportunities is 64 insertion opportunities of the third type, wherein, in the regular pattern of the third type of insertion opportunities, messages are sent in one or a combination of following ways:

sending Connectivity Verification (CV) messages in first to seventeenth allocated opportunities of the 64 opportunities;

sending a Capability Set (CS) message at an eighteenth opportunity of the 64 opportunities;

sending a one-way delay measurement (1DM) message or a two-way delay measurement message (2DMM) or a two-way delay measurement response (2DMR) message in nineteenth to thirty-first allocated opportunities of the 64 opportunities; thirty-second to sixth-fourth opportunities of the 64 opportunities are reserved.

\* \* \* \* \*